(12) United States Patent
Lourenco et al.

(10) Patent No.: US 10,288,347 B2
(45) Date of Patent: May 14, 2019

(54) METHOD OF REMOVING CARBON DIOXIDE DURING LIQUID NATURAL GAS PRODUCTION FROM NATURAL GAS AT GAS PRESSURE LETDOWN STATIONS

(71) Applicants: 1304338 Alberta Ltd., Edmonton (CA); 1304342 Alberta Ltd., Edmonton (CA)

(72) Inventors: Jose Lourenco, Edmonton (CA); MacKenzie Millar, Edmonton (CA)

(73) Assignees: 1304338 Alberta Ltd., Edmonton (CA); 1304342 Alberta Ltd., Edmonton (CA)

( * ) Notice: Subject to any disclaimer, the term of this patent is extended or adjusted under 35 U.S.C. 154(b) by 274 days.

(21) Appl. No.: 15/504,003

(22) PCT Filed: Aug. 15, 2014

(86) PCT No.: PCT/CA2014/050784
§ 371 (c)(1),
(2) Date: Feb. 14, 2017

(87) PCT Pub. No.: WO2016/023098
PCT Pub. Date: Feb. 18, 2016

(65) Prior Publication Data
US 2017/0241709 A1    Aug. 24, 2017

(51) Int. Cl.
*F25J 3/08* (2006.01)
*C10L 3/10* (2006.01)
(Continued)

(52) U.S. Cl.
CPC .................. *F25J 3/08* (2013.01); *C10L 3/104* (2013.01); *C10L 3/106* (2013.01); *F25J 1/004* (2013.01);
(Continued)

(58) Field of Classification Search
CPC .... F25J 3/08; F25J 3/067; F25J 3/0615; F25J 1/004; F25J 1/0022; F25J 1/0035;
(Continued)

(56) References Cited

U.S. PATENT DOCUMENTS 2,168,438 A    8/1939    Carrier
3,002,362 A    10/1961   Morrison
(Continued)

FOREIGN PATENT DOCUMENTS

CA    1048876 A    2/1979
CA    2 422 893 A1    2/2002
(Continued)

OTHER PUBLICATIONS

Hudson, H.M., et al., "Reducing Treating Requirements for Cryogenic NGL Recovery Plants," Proceedings of the 80th Annual Convention of the Gas Processors Association, Mar. 12, 2001, San Antonio, Texas, 15 pages.
(Continued)

*Primary Examiner* — Emmanuel Duke
(74) *Attorney, Agent, or Firm* — Christensen O'Connor Johnson Kindness, PLLC

(57) ABSTRACT

A method is described for removing carbon dioxide during Liquid Natural Gas production from natural gas at gas pressure letdown stations. The above method removes carbon dioxide from a Liquid Natural Gas production stream by using hydrocarbon fractions taken from a gas for consumption stream as a carbon dioxide stripping adsorption agent for a stripping column used to remove carbon dioxide.

5 Claims, 3 Drawing Sheets

(51) Int. Cl.
*F25J 1/00* (2006.01)
*F25J 1/02* (2006.01)
*F25J 3/02* (2006.01)
*F25J 3/06* (2006.01)

(52) U.S. Cl.
CPC ........... *F25J 1/0022* (2013.01); *F25J 1/0035* (2013.01); *F25J 1/0037* (2013.01); *F25J 1/0042* (2013.01); *F25J 1/0201* (2013.01); *F25J 1/0232* (2013.01); *F25J 3/0209* (2013.01); *F25J 3/0233* (2013.01); *F25J 3/0266* (2013.01); *F25J 3/0615* (2013.01); *C10L 2290/06* (2013.01); *C10L 2290/08* (2013.01); *C10L 2290/48* (2013.01); *C10L 2290/54* (2013.01); *C10L 2290/545* (2013.01); *F25J 2205/04* (2013.01); *F25J 2205/50* (2013.01); *F25J 2210/06* (2013.01); *F25J 2215/04* (2013.01); *F25J 2220/64* (2013.01); *F25J 2220/66* (2013.01); *F25J 2230/08* (2013.01); *F25J 2230/32* (2013.01); *F25J 2260/10* (2013.01); *F25J 2270/04* (2013.01); *Y02C 10/12* (2013.01)

(58) Field of Classification Search
CPC ........ F25J 1/0037; F25J 3/0266; F25J 1/0042; F25J 1/0201; F25J 1/0232; F25J 3/0209; F25J 3/0233; F25J 2230/32; F25J 2220/64; F25J 2220/66; F25J 2230/08; F25J 2210/06; F25J 2260/10; F25J 2270/04; C10L 3/106; C10L 3/104; C10L 2290/48; C10L 2290/54; C10L 2290/08; C10L 2290/545; C10L 2290/06; Y02C 10/12
See application file for complete search history.

(56) References Cited

U.S. PATENT DOCUMENTS

| | | | |
|---|---|---|---|
| 3,152,194 A | 10/1964 | Pohl et al. |
| 3,184,926 A | 5/1965 | Blake |
| 3,241,933 A | 3/1966 | Ploum et al. |
| 3,280,575 A | 10/1966 | Drake |
| 3,315,475 A | 4/1967 | Harmens |
| 3,367,122 A | 2/1968 | Tutton |
| 3,653,220 A | 4/1972 | Foster et al. |
| 3,735,600 A | 5/1973 | Dowdell et al. |
| 3,747,359 A | 7/1973 | Streich |
| 3,754,405 A | 8/1973 | Rosen |
| 3,792,590 A | 2/1974 | Lofredo et al. |
| 3,846,993 A | 11/1974 | Bates |
| 3,859,811 A | 1/1975 | Duncan |
| 3,892,103 A | 7/1975 | Antonelli |
| 3,919,853 A | 11/1975 | Rojey |
| 3,962,881 A | 6/1976 | Muska |
| 4,033,735 A | 7/1977 | Swenson |
| 4,041,724 A | 8/1977 | Gustafsson |
| 4,170,115 A | 10/1979 | Ooka et al. |
| 4,279,130 A | 7/1981 | Finch et al. |
| 4,418,530 A | 12/1983 | Bodrov et al. |
| 4,424,680 A | 1/1984 | Rothchild |
| 4,430,103 A | 2/1984 | Gray et al. |
| 4,444,577 A | 4/1984 | Perez |
| 4,617,039 A | 10/1986 | Buck |
| 4,681,612 A | 7/1987 | O'Brien et al. |
| 4,710,214 A | 12/1987 | Sharma et al. |
| 4,751,151 A | 6/1988 | Healy et al. |
| 4,869,740 A | 9/1989 | Campbell et al. |
| 4,907,405 A | 3/1990 | Polizzotto |
| 4,936,888 A | 6/1990 | DeLong |
| 5,026,952 A | 6/1991 | Bauer |
| 5,062,270 A | 11/1991 | Haut et al. |
| 5,137,558 A | 8/1992 | Agrawal |
| 5,295,350 A | 3/1994 | Child et al. |
| 5,329,774 A | 7/1994 | Tanguay et al. |
| 5,425,230 A | 6/1995 | Shpak |
| 5,440,894 A | 8/1995 | Schaeffer et al. |
| 5,560,212 A | 10/1996 | Hansen |
| 5,678,411 A | 10/1997 | Matsumura et al. |
| 5,685,170 A | 11/1997 | Sorensen |
| 5,743,110 A | 4/1998 | Laude-Bousquet |
| 5,782,958 A | 7/1998 | Rojey et al. |
| 5,799,505 A | 9/1998 | Bonaquist et al. |
| 5,953,935 A | 9/1999 | Sorensen |
| 5,956,971 A | 9/1999 | Cole et al. |
| 5,983,663 A | 11/1999 | Sterner |
| 6,089,022 A | 7/2000 | Zednik et al. |
| 6,089,028 A | 7/2000 | Bowen et al. |
| 6,131,407 A * | 10/2000 | Wissolik ............... F25J 1/0012 62/606 |
| 6,138,473 A | 10/2000 | Boyer-Vidal |
| 6,182,469 B1 * | 2/2001 | Campbell ............. F25J 3/0209 62/621 |
| 6,266,968 B1 | 7/2001 | Redlich |
| 6,286,315 B1 | 9/2001 | Staehle |
| 6,378,330 B1 | 4/2002 | Minta et al. |
| 6,401,486 B1 | 6/2002 | Lee et al. |
| 6,432,565 B1 | 8/2002 | Haines |
| 6,517,286 B1 | 2/2003 | Latchem |
| 6,526,777 B1 | 3/2003 | Campbell et al. |
| 6,581,409 B2 | 6/2003 | Wilding et al. |
| 6,606,860 B2 | 8/2003 | McFarland |
| 6,640,555 B2 | 11/2003 | Cashin |
| 6,662,589 B1 | 12/2003 | Roberts et al. |
| 6,694,774 B1 * | 2/2004 | Rashad ................. F25J 1/0005 62/611 |
| 6,739,140 B2 | 5/2004 | Bishop et al. |
| 6,751,985 B2 | 6/2004 | Kimble et al. |
| 6,889,523 B2 | 5/2005 | Wilkinson et al. |
| 6,932,121 B1 | 8/2005 | Shivers, III |
| 6,945,049 B2 | 9/2005 | Madsen |
| 7,051,553 B2 | 5/2006 | Mak et al. |
| 7,107,788 B2 | 9/2006 | Patel et al. |
| 7,155,917 B2 | 1/2007 | Baudat |
| 7,219,502 B2 | 5/2007 | Nierenberg |
| 7,257,966 B2 | 8/2007 | Lee et al. |
| 7,377,127 B2 | 5/2008 | Mak |
| 8,429,932 B2 | 4/2013 | Lourenco et al. |
| 8,640,494 B2 | 2/2014 | Lourenco et al. |
| 8,850,849 B2 | 10/2014 | Martinez et al. |
| 8,887,513 B2 | 11/2014 | Kotzot et al. |
| 2002/0170297 A1 | 11/2002 | Quine et al. |
| 2003/0008605 A1 | 1/2003 | Hartford, Jr. et al. |
| 2003/0019219 A1 | 1/2003 | Viegas et al. |
| 2003/0051875 A1 | 3/2003 | Wilson |
| 2003/0182947 A1 | 10/2003 | Kimble et al. |
| 2003/0196452 A1 * | 10/2003 | Wilding ................. F25J 1/0201 62/613 |
| 2004/0065085 A1 | 4/2004 | Madsen |
| 2005/0086974 A1 | 4/2005 | Steinbach et al. |
| 2005/0244277 A1 | 11/2005 | Hurst, Jr. et al. |
| 2006/0213222 A1 | 9/2006 | Whitesell |
| 2006/0213223 A1 | 9/2006 | Wilding et al. |
| 2006/0242970 A1 | 11/2006 | Yang et al. |
| 2006/0260355 A1 | 11/2006 | Roberts et al. |
| 2007/0062216 A1 | 3/2007 | Mak et al. |
| 2007/0107465 A1 | 5/2007 | Turner et al. |
| 2008/0016910 A1 | 1/2008 | Brostow et al. |
| 2009/0084132 A1 | 4/2009 | Dragomir et al. |
| 2009/0113928 A1 | 5/2009 | Vandor et al. |
| 2009/0194460 A1 | 8/2009 | Klein Nagul Voort et al. |
| 2009/0194461 A1 | 9/2009 | Bras et al. |
| 2009/0249829 A1 | 10/2009 | Lourenco et al. |
| 2009/0282863 A1 | 11/2009 | Lourenco et al. |
| 2009/0282865 A1 | 11/2009 | Martinez et al. |
| 2010/0000234 A1 | 1/2010 | Bras et al. |
| 2010/0242499 A1 | 9/2010 | Lourenco et al. |
| 2010/0287985 A1 | 11/2010 | Martinez et al. |
| 2011/0036122 A1 | 2/2011 | Betting et al. |
| 2011/0067441 A1 | 3/2011 | Martinez et al. |
| 2011/0094263 A1 | 4/2011 | Wilding et al. |
| 2011/0174017 A1 | 7/2011 | Victory et al. |

(56) References Cited

U.S. PATENT DOCUMENTS

| | | |
|---|---|---|
| 2012/0036888 A1 | 2/2012 | Vandor |
| 2012/0060554 A1 | 3/2012 | Schmidt |
| 2012/0096896 A1 | 4/2012 | Patel et al. |
| 2012/0169049 A1 | 7/2012 | Oxner et al. |
| 2012/0255325 A1 | 10/2012 | Prim |
| 2013/0333416 A1 | 12/2013 | Lourenco et al. |
| 2015/0016952 A1 | 1/2015 | Oxner |
| 2015/0143842 A1 | 5/2015 | Lourenco et al. |

FOREIGN PATENT DOCUMENTS

| | | |
|---|---|---|
| CA | 2 467 338 A1 | 7/2003 |
| CA | 2 516 785 A1 | 9/2004 |
| CA | 2 552 366 A1 | 7/2005 |
| CA | 2 299 695 A1 | 7/2007 |
| CA | 2 536 075 C | 7/2007 |
| CA | 2 318 802 A1 | 2/2008 |
| CA | 2 777 760 A1 | 5/2011 |
| CA | 2 728 716 A1 | 7/2012 |
| CA | 2 515 999 A1 | 12/2012 |
| CA | 2 763 081 A1 | 6/2013 |
| CN | 1615415 A | 5/2005 |
| CN | 101948706 A | 1/2011 |
| DE | 44 16 359 A1 | 11/1995 |
| EP | 0 482 222 A1 | 4/1992 |
| EP | 0 566 285 A1 | 10/1993 |
| EP | 0 635 673 A1 | 1/1995 |
| EP | 0 780 649 A1 | 6/1997 |
| FR | 2 420 081 A1 | 10/1979 |
| GB | 1011453 | 12/1965 |
| GB | 2 103 354 A | 2/1983 |
| JP | 3-236589 A | 10/1991 |
| JP | 5-263998 A | 10/1993 |
| JP | 2002-295799 A | 10/2002 |
| JP | 2003-165707 A | 6/2003 |
| RU | 2 180 420 C2 | 3/2002 |
| RU | 2 232 342 C1 | 7/2004 |
| WO | 94/11626 A1 | 5/1994 |
| WO | 97/01069 A1 | 1/1997 |
| WO | 98/59205 A2 | 12/1998 |
| WO | 99/31447 A3 | 6/1999 |
| WO | 00/52403 A1 | 9/2000 |
| WO | 03/081038 A1 | 10/2003 |
| WO | 03/095913 A1 | 11/2003 |
| WO | 03/095914 A1 | 11/2003 |
| WO | 2004/010480 A1 | 1/2004 |
| WO | 2004/052511 A1 | 6/2004 |
| WO | 2004/109180 A1 | 12/2004 |
| WO | 2004/109206 A1 | 12/2004 |
| WO | 2005/045337 A1 | 5/2005 |
| WO | 2006/004723 A1 | 1/2006 |
| WO | 2006/019900 A1 | 2/2006 |
| WO | 2006/036441 A1 | 4/2006 |
| WO | 2008/006221 A1 | 1/2008 |
| WO | 2009/061777 A1 | 5/2009 |
| WO | 2012/015554 A1 | 2/2012 |
| WO | 2014/032179 A1 | 3/2014 |

OTHER PUBLICATIONS

Kidnay, A.J., and W.H. Parrish, "Fundamentals of Natural Gas Processing," Taylor & Francis Group, Abingdon, U.K., © 2006, 440 pages.

International Search Report and Written Opinion dated Jul. 18, 2014, issued in corresponding International Application No. PCT/CA2014/050374, filed Apr. 14, 2014, 9 pages.

International Search Report and Written Opinion dated May 1, 2012, issued in corresponding International Application No. PCT/CA2012/050030, filed Jan. 18, 2012, 9 pages.

International Search Report and Written Opinion dated Oct. 24, 2013, issued in corresponding International Application No. PCT/CA2013/050639, filed Aug. 19, 2013, 7 pages.

International Search Report and Written Opinion dated Aug. 2, 2013, issued in corresponding International Application No. PCT/CA2013/050363, filed May 10, 2013, 9 pages.

International Search Report and Written Opinion dated Jun. 7, 2016, issued in corresponding International Application No. PCT/CA2015/050896, filed Sep. 16, 2015, 6 pages.

International Search Report and Written Opinion dated Aug. 30, 2016, issued in corresponding International Application No. PCT/CA2016/050559, filed May 19, 2016, 7 pages.

* cited by examiner

METHOD OF REMOVING CARBON DIOXIDE DURING LIQUID NATURAL GAS PRODUCTION FROM NATURAL GAS AT GAS PRESSURE LETDOWN STATIONS

FIELD

There is described a method of removing carbon dioxide during production of Liquid Natural Gas (LNG) from natural gas at gas pressure letdown stations.

BACKGROUND

In Canadian Patent 2,536,075 entitled "Method of conditioning natural gas in preparation for storage", there is disclosed a method in which natural gas is divided into a primary stream and a secondary stream. Through a series of heat exchanges a temperature of the primary stream is raised in preparation for consumption and a temperature of the secondary stream is lowered in to produce Liquid Natural Gas (LNG).

A serious problem not addressed in this patent is the presence of carbon dioxide ($CO^2$) in the LNG . In the production of LNG , cryogenic temperatures are reached where the carbon dioxide can form dry ice which can plug lines and equipment. When producing LNG at gas pressure letdown stations the carbon dioxide must be removed to prevent the formation of dry ice and plugging of lines and equipment on the production plant. Traditionally, this concern is addressed by employing mol sieves to absorb and remove the carbon dioxide from the LNG production gas stream. These mol sieves are the largest component of a LNG plant and are energy intensive to regenerate. There will hereinafter be described an alternative method of addressing carbon dioxide removal.

SUMMARY

There is provided a method of removing carbon dioxide during Liquid Natural Gas production from natural gas at a gas pressure let down station. The method involves passing high pressure natural gas through a first heat exchanger to pre-cool the high pressure natural gas entering the pressure let down station. The pre-cooled high pressure natural gas is then passed through a separator to remove condensates from the high pressure natural gas exiting the first heat exchanger. The high pressure natural gas is then passed through a natural gas dewatering unit to remove water from the high pressure natural gas exiting the separator. The dewatered high pressure natural gas then is passed through a second heat exchanger to pre-cool the dewatered high pressure natural gas. A step is then taken of splitting the dewatered high pressure natural gas into a Liquid Natural Gas production stream and a gas for consumption stream. The Liquid Natural Gas production steam is passed through a third heat exchanger to pre-cool the Liquid Natural Gas production stream. The Liquid Natural Gas production stream is passed through a carbon dioxide stripping column to remove carbon dioxide. The gas for consumption stream is passed through a first pressure reduction unit to depressurize the gas for consumption stream. The gas for consumption stream is passed through a second separator to recover condensed hydrocarbon fractions from the gas for consumption stream. The condensed hydrocarbon fractions from the gas for consumption stream are routed to the stripping column for use as a carbon dioxide stripping adsorption agent. The Liquid Natural Gas production stream is then passed through one or more further heat exchangers to further cool the Liquid Natural Gas production stream to facilitate Liquid Natural Gas production. The Liquid Natural Gas production stream is passed through a second pressure reduction unit to depressurize the Liquid Natural Gas production stream. A final step is then taken of passing the Liquid Natural Gas production stream through a third separator to achieve separation of Liquid Natural Gas from vapours.

The above described method achieves the objective of removal of carbon dioxide from the Liquid Natural Gas production stream by using hydrocarbon fractions taken from the gas for consumption stream as a carbon dioxide stripping adsorption agent for the stripping column used to remove carbon dioxide. There is much less cost and maintenance associated with this method, as compared to the use of a mole sieve.

The pressure reduction units used can be gas expanders or J.T. (Joules-Thomson) valves. The use of gas expanders will be described and illustrated with reference to FIG. 2 and the use of a J.T. valve will be described and illustrated with reference to FIG. 3. The use of gas expanders is preferred as they are more efficient and produce colder temperatures. IN addition, when a gas expander is used with an associated generator, energy is produced that can be used for other purposes.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

The method will now be described with reference to FIG. 1 through FIG. 3.

Figure 2:
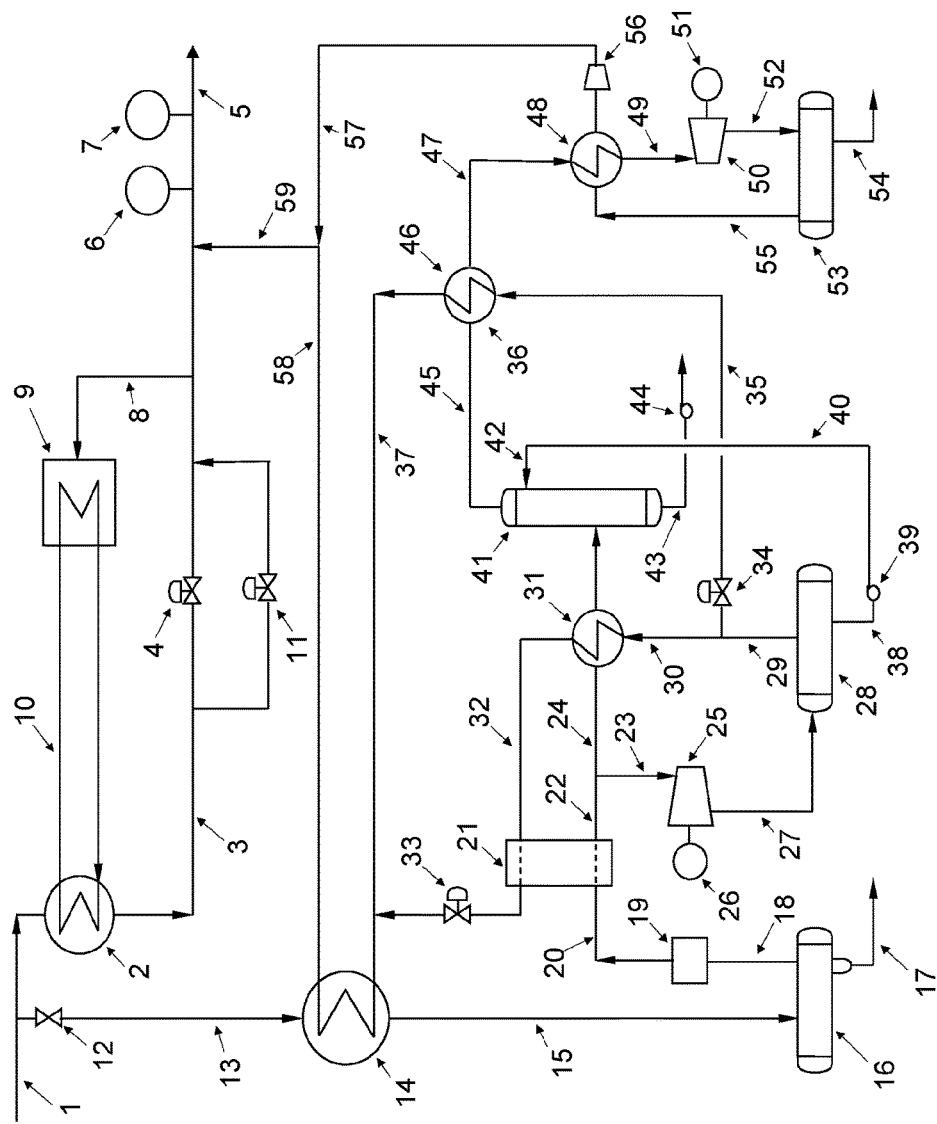
FIG. 2 is a schematic diagram of a LNG production process at added to an existing gas pressure letdown station and equipped with; gas pre-treatment units, heat exchangers, a stripping column, gas expanders, KO drums, pumps and LNG storage. The process natural gas stream is supplied from high pressure natural gas transmission pipeline.

Referring to FIG. 2, this method was developed with a view to pre-treat and produce LNG at gas pressure letdown stations. The disclosed invention utilized a different approach in a unique and innovative variant of the methane expansion cycle, which to date is used in commercial applications known as letdown plants. The system here described takes advantage of the gas streams delivered to end users at pressure letdown stations. The inventors, have previously been granted a patent for LNG production at pressure letdown stations employing expanders/generators, heat exchangers and separators to generate and recover refrigeration to produce LNG. This invention allows for an improved method of producing LNG at gas pressure letdown stations. This method allows for LNG to be pre-treated for the removal of carbon dioxide using the condensed heavy hydrocarbon fractions as a stripping agent in a stripping column. This is an improvement on the existing practice of mol sieves for carbon dioxide removal. The stripping agents employed in the stripping column are the hydrocarbon fractions condensed and recovered in a separator downstream of the expander/generator on the continuous natural gas stream. These hydrocarbon fractions are ideal stripping agents in terms of temperature and composition for carbon dioxide stripping in a stripping column. This new feature is an improvement on the writer previous patented LNG production process at gas pressure letdown stations. The description of application of the method should, therefore, be considered as an example.

Figure 1:
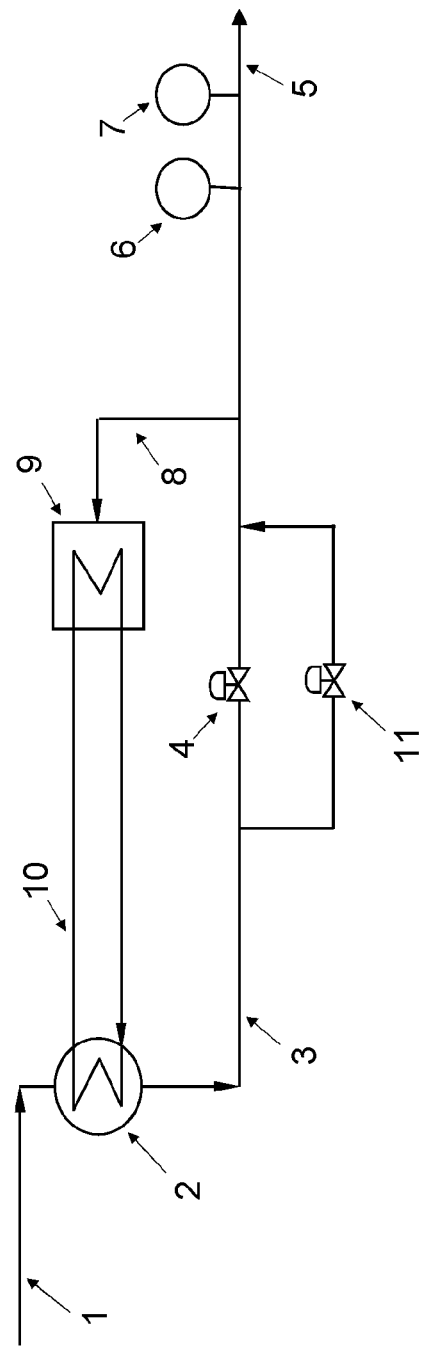
FIG. 1 (labelled as "PRIOR ART") is a schematic diagram of a pressure letdown station equipped with JT valves for pressure controlled letdown, a heater and a heat exchanger.

Referring to FIG. 1, a typical gas pressure letdown station in a natural gas transmission pipeline. Natural gas is delivered from an high pressure transmission pipeline, gas stream 1 is first pre-heated in heat exchanger 2, the heated gas stream 3 is depressurized through a JT valve 4 to pipeline 5 pressure setting 7 and then routed to end users. A gas stream 8 provides the fuel required to heater 9. A closed recycling loop glycol/water 10 transfers the heat from heater 9 to gas heat exchanger 2 to pre-heat the gas. A temperature setting 6 controls the gas pre-heat requirements. This simplified process arrangement as shown is FIG. 1 constitutes a standard operation at gas pressure letdown stations. The purpose of pre-heating the gas before decreasing the pressure at the pressure letdown station is to prevent the formation of hydrates due to the presence of water in the gas composition.

Referring to FIG. 2, the proposed invention process arrangement is added to an existing pressure letdown station as shown operating in parallel. In the proposed invention, stream 13 is first pre-cooled in heat exchanger 14, the cooled stream 15 enters separator 16 where condensate is removed through stream 17. The vapour stream 18 is de-watered in pre-treatment unit 19. The dried gas stream 20 is further cooled in heat exchanger 21. The cooler gas stream 22 is split into streams 23 and 24. Stream 23 is the continuous natural gas stream to end users, it is reduced in pressure at expander/generator 25/26 to meet the pressure requirements of end users. The dry, depressurized, very cold, gas stream 27 enters separator 28 where the condensed hydrocarbon fraction is separated from the vapour fraction. Stream 24 is further cooled in heat exchanger 31 before entering CO2 stripper column 41. The separated very cold gas stream 29 is split into streams 30 and 35. Stream 30 is warmed up in heat exchanger 31, 21 and 14 before distribution to end users. Stream 35 is warmed up through heat exchangers 46 and 14 before distribution to end users. The very cold condensate stream 38 enters pump 39 and is pumped to stripper column 41 as an adsorption stream 42 to strip CO2 from stream 24. A mixture of CO2 and heavy hydrocarbon fractions exit the stripping column 41 through stream 43 and pump 44. The CO2 stripped gas stream 45 is further cooled in heat exchangers 46 and 48 before entering expander/generator 50/51 and entering separator 53 through line 52. The liquid fraction LNG exits separator 53 to storage through line 54. The cryogenic vapour 55 is warmed up in heat exchanger 48, enters compressor 56, is routed through line 57 and mixed with stream 58 and delivered to end users through line 59.

The inventive step in this process is the generation and recovery of coolth energy in conjunction with a diverted gas stream 24 to pre-treat and produce LNG using a CO2 stripper column at gas pressure letdown stations. The use of expanders/generators in pressure reduction processes to generate the Joule Thompson effect is well understood and in practice in the gas industry in various forms. The advantage of the proposed invention is the process configuration which utilizes produced condensed hydrocarbon fractions as a stripping agent in a stripping column at a pressure letdown station to strip the CO2 fraction from the LNG production stream. Typically pressure letdown stations operate as shown in FIG. 1, requiring the use of a portion of the gas flow through the station (generally about 1% of the gas flow) to pre-heat the gas to prevent the formation of hydrates. The proposed invention eliminates the present practice of combusting gas for gas pre-heating. It eliminates the need to use the industry standard mol sieve technology at a pressure letdown station to remove CO2 from a natural gas LNG producing stream. The CO2 stripping adsorption agents are the hydrocarbon fractions condensed in the process from the natural gas stream to end users. The amount of adsorption agent required can be met through a controlled recycled stream supplied from stream 44 until it reaches steady state since there is a continuous new supply of hydrocarbon fractions from stream 38.

Figure 3:
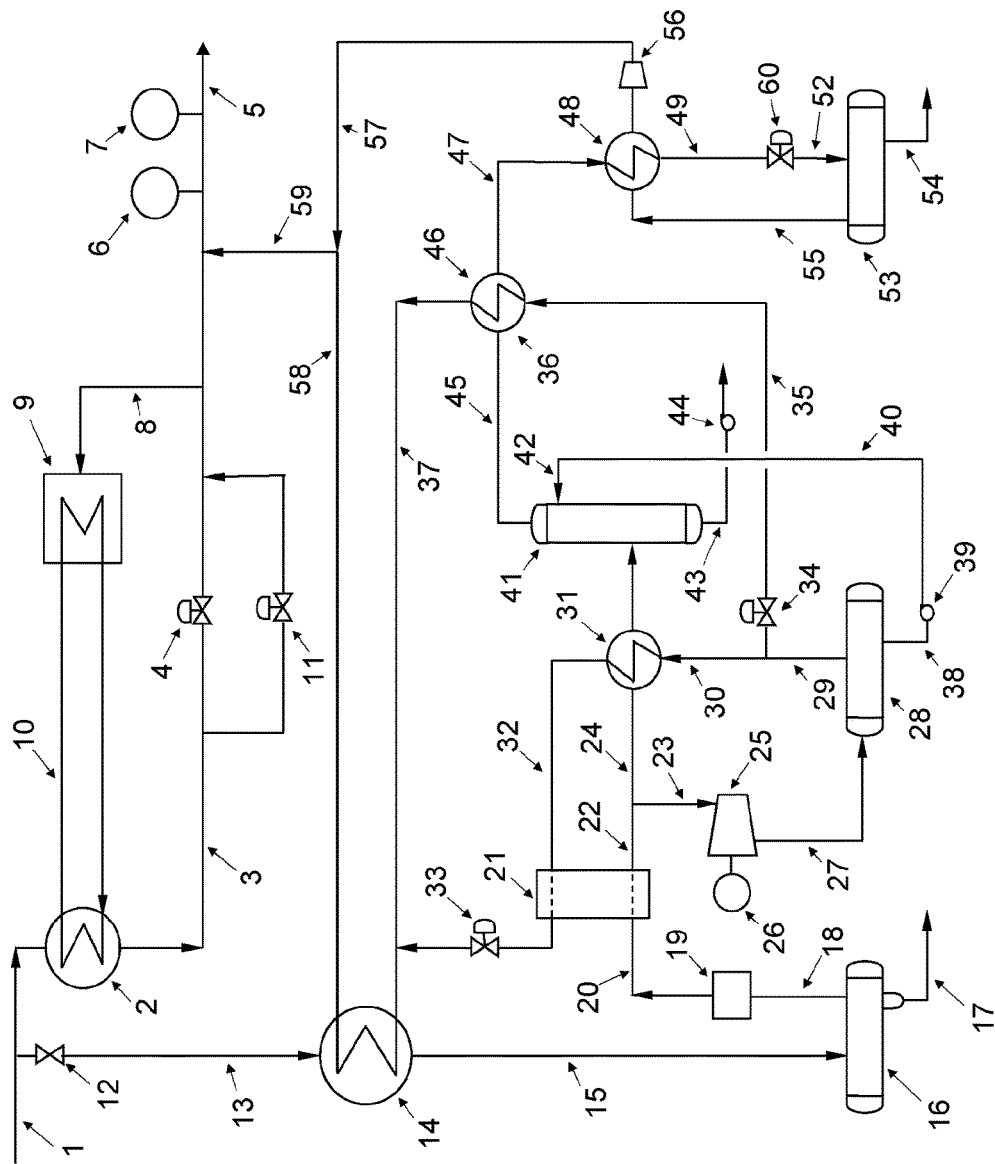
FIG. 3 is a schematic diagram of a LNG production process involving the use of J.T. valves in place of gas expanders, but in all other respects identical to FIG. 2.

FIG. 3 shows the same method as that illustrated in FIG. 2, with all reference numerals indicating identical elements. The only difference between FIG. 2 and FIG. 3, is that in FIG. 2 the pressure reduction units used are gas expanders 25 and 50, whereas in FIG. 3 the pressure reducing units are gas expander 25 and J.T. Valve 60 are used as pressure reduction units in place of gas expander 50.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A method of removing carbon dioxide during Liquid Natural Gas production natural gas at a gas pressure let down station, comprising:

passing high pressure natural gas through a first heat exchanger to pre-cool the high pressure natural gas entering the pressure let down station;

passing the pre-cooled high pressure natural gas through a separator to remove condensates from the high pressure natural gas exiting the first heat exchanger;

passing the high pressure natural gas through a natural gas dewatering unit to remove water from the high pressure natural gas exiting the separator;

passing the dewatered high pressure natural gas through a second heat exchanger to pre-cool the dewatered high pressure natural gas;

splitting the dewatered high pressure natural gas into a Liquid Natural Gas production stream and a gas for consumption stream;

passing the Liquid Natural Gas production steam through a third heat exchanger to pre-cool the Liquid Natural Gas production stream;

passing the Liquid Natural Gas production stream through a carbon dioxide stripping column to remove carbon dioxide;

passing the gas for consumption stream through a first pressure reduction unit to depressurize the gas for consumption stream;

passing the gas for consumption stream through a second separator to recover condensed hydrocarbon fractions from the gas for consumption stream; and passing the condensed hydrocarbon fractions from the gas for consumption stream to the stripping column for use as a carbon dioxide stripping adsorption agent;

passing the Liquid Natural Gas production stream through one or more further heat exchangers to further cool the Liquid Natural Gas production stream to facilitate Liquid Natural Gas production;

passing the Liquid Natural Gas production stream through a second pressure reduction unit to depressurize the Liquid Natural Gas production stream; and passing the Liquid Natural Gas production stream through a third separator to achieve separation of Liquid Natural Gas (LNG) and vapors.

2. The method of claim 1, wherein the one or more further heat exchangers include a fourth heat exchanger and a fifth heat exchanger.

3. The method of claim 1, wherein a precooling stream passing through the first heat exchanger is provided by vapour fractions drawn from the second and third separator.

4. The method of claim 1, wherein the temperature of the LNG production stream before the stripper is controlled on demand to meet process requirements.

5. The method of claim 1, wherein the line carrying condensed hydrocarbon fractions to the stripping column has a bypass line that bypasses the stripping column, such that the quantity of condensed hydrocarbon fractions entering the stripping column is controlled by diverting excess condensed hydrocarbon fractions to the bypass line.

* * * * *